United States Patent [19] [11] 4,045,351
Peterson [45] Aug. 30, 1977

[54] SINK STRAINER DEVICE

[76] Inventor: Carl M. Peterson, 2746 Taylor, Longview, Wash. 98632

[21] Appl. No.: 645,836

[22] Filed: Dec. 31, 1975

[51] Int. Cl.² .................. B01D 35/02; E03C 1/26
[52] U.S. Cl. .................... 210/238; 4/190; 4/292; 210/315; 210/446; 210/484
[58] Field of Search .................. 4/190, 287, 292, 291; 210/236, 237, 238, 299, 300, 310, 445, 446, 447, 448, 449, 450, 452, 463, 484, 315

[56] References Cited

U.S. PATENT DOCUMENTS

| 495,998 | 4/1893 | Perkins | 210/238 |
| 960,901 | 6/1910 | Hall | 4/190 X |
| 1,976,549 | 10/1934 | Foose | 4/287 |
| 2,012,196 | 8/1935 | Lewis | 210/447 X |
| 2,044,096 | 6/1936 | Moran | 210/315 X |
| 2,285,833 | 6/1942 | Platt | 210/238 |
| 2,512,394 | 6/1952 | Sullivan | 210/447 X |
| 2,674,376 | 4/1954 | Swan | 210/447 X |
| 2,915,188 | 12/1959 | Buker | 210/447 |

FOREIGN PATENT DOCUMENTS

| 381,572 | 9/1923 | Germany | 210/447 |
| 405,630 | 7/1966 | Switzerland | 4/190 |

Primary Examiner—Thomas G. Wyse
Assistant Examiner—Robert H. Spitzer
Attorney, Agent, or Firm—Robert E. Kleve

[57] ABSTRACT

The invention comprises a kitchen or bathroom strainer device. An elongated cylinder is mounted beneath the sink in communication with the opening, a mesh strainer holder is mounted within the cylinder, a disposable mesh strainer is mounted within the strainer holder and is removable for exchange through an opening in an end of the cylinder.

1 Claim, 15 Drawing Figures

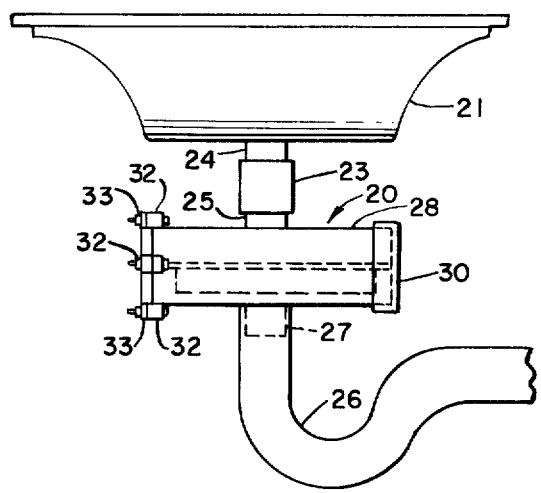
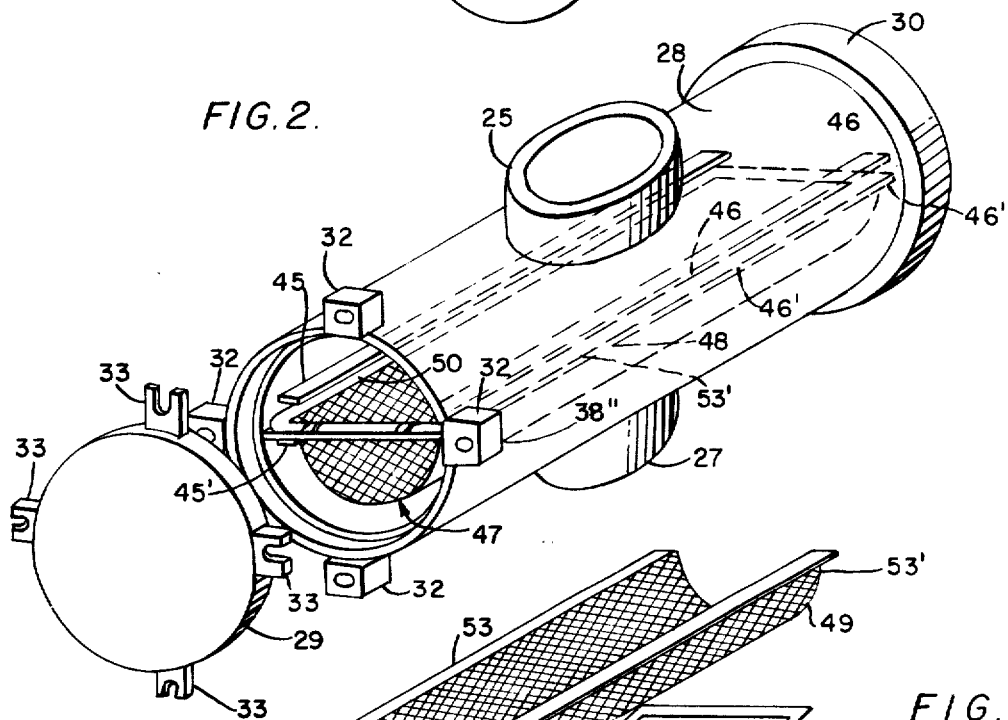
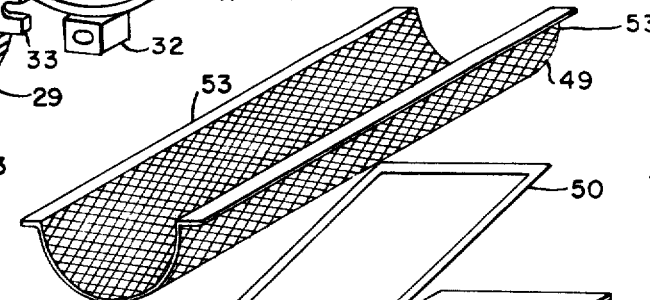
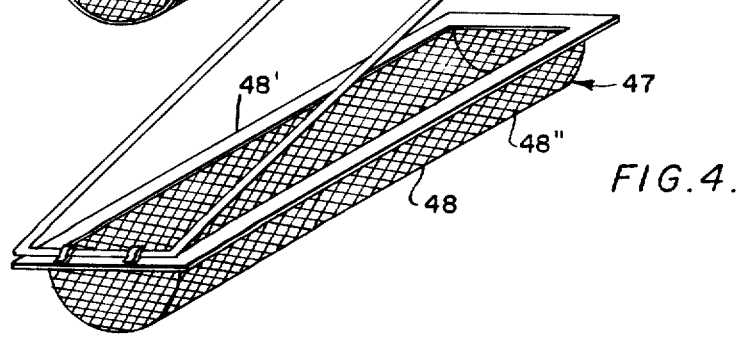

SINK STRAINER DEVICE

This invention relates to plumbing equipment more particularly the invention relates to drain pipe cleaners and the like.

It is an object of the invention to provide a novel kitchen an bathroom drain pipe apparatus having a removable disposable mesh receptacle for trapping sewage deposited in the drain.

It is another object of the invention to provide a novel bathroom drain pipe apparatus having an enlarged chamber beneath the bathroom sink mounted into the drain pipe connection with a removable cover and a removable disposable strainer for trapping and disposing garbage being trapped in the drain.

It is another object of the invention to provide a novel kitchen drain pipe apparatus having an enlarged chamber beneath the kitchen sink mounted into the drain pipe connection from the kitchen sink, with a removable disposable strainer for trapping and disposing of gargage being dumped into the drain.

Further objects and advantages of the invention will become apparent as the description proceeds and when taken in conjunction with the accompanying drawings wherein:

FIG. 1 is a side elevational view of the bathroom sink drain pipe apparatus shown installed in the drain pipe of a bathroom sink.

FIG. 2 is an enlarged perspective view of the bathroom sink drain pipe chamber beneath the bathroom sink with the removable strainer shown installed in the chamber and with the cover for the chamber shown detached.

FIG. 3 is a perspective view of the removable disposable structure.

FIG. 4 is a perspective view of the strainer container or holder which holds the disposable strainer.

Figure 5:
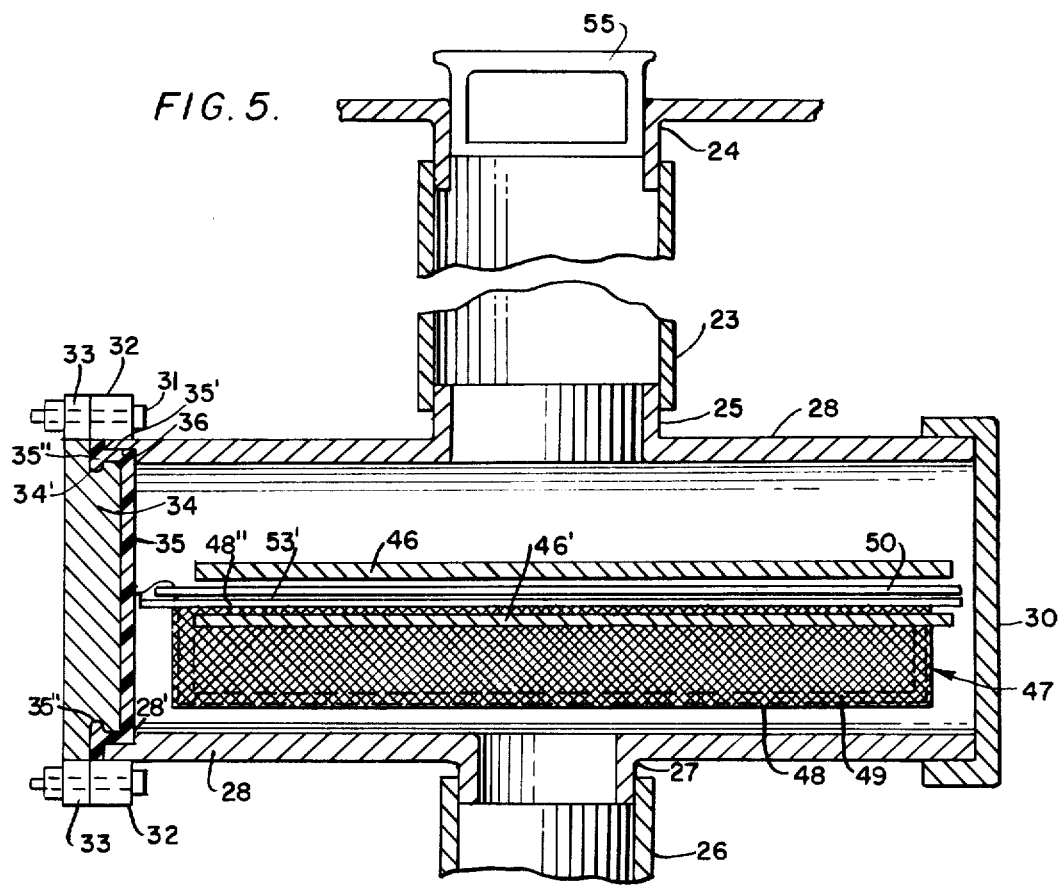
FIG. 5 is an enlarged cutaway view of the bathroom sink drain pipe device illustrating the strainer casing and the removable strainer and strainer holder mounted in operative position in the strainer casing.

Briefly stated, the invention comprises a kitchen or bathroom drain pipe apparatus having an enlarged chamber within the drain pipe with a removable disposable strainer mounted in the chamber to enable sewage and garbage deposited into the drain to be caught by the strainer and removed from the drain with the removable disposable strainer.

Referring more particularly to the drawing in FIG. 1-7, inclusive, the bathroom type strainer device 20 is illustrated.

In the FIG. 1, the bathroom type strainer 20 is illustrated mounted beneath a conventional bathroom type sink 21. A conventional pipe connection 23 or sleeve connects the outlet pipe 24 of the sink 21 with an inlet pipe 25 into the strainer 20. A conventional elbow 26 connects at one end to the outlet pipe 27 from the strainer and the elbow at its other end and extends onto a conventional drainage outlet (not shown).

The front end cap 29 is attached to the sleeve 28 by four bolts 31. The sleeve 28 has four mounting lugs 32 which are fixed to the outer surface of the sleeve 28. The cap 29 has four mounting lugs 33 which are fixed to the outer surface of the cap with the bolts 31 passing through bores in the lugs 32 and through slots in the lugs 33, with the heads of the bolts 31 abutting the lugs 32, and with threaded nuts threaded on the bolts 31 abutting the lugs 33 and with the nuts tightened to lock the cap 29 to the sleeve 28. The cap 29 also has a projecting disc portion 34 with an annular channel 34' therein. A rubber seal 35 has an annular flange 35' with an inwardly projecting annular ridge 35", with the annular flange 35" fitted over the disc 34 and the projecting annular ridge 35" projecting into the annular channel 34' to secure the seal or disc 35 to the cap as illustrated in FIG. 5.

The rubber disc 35 serves as a rubber seal to close the end of the sleeve 28 in water tight relation by the disc 35 abutting against the annular ridge 36 at the forward end of the sleeve 28 in watertight relation when the cap 29 is bolted onto the sleeve 28.

Figure 8:
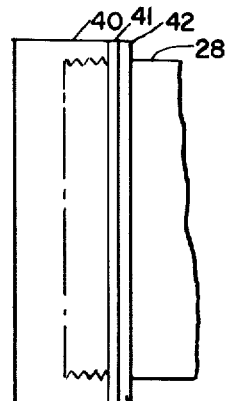
FIG. 8 is a modified form of a cap closure construction for the bathroom strainer device having a screw or thread cap construction.
Figure 6:
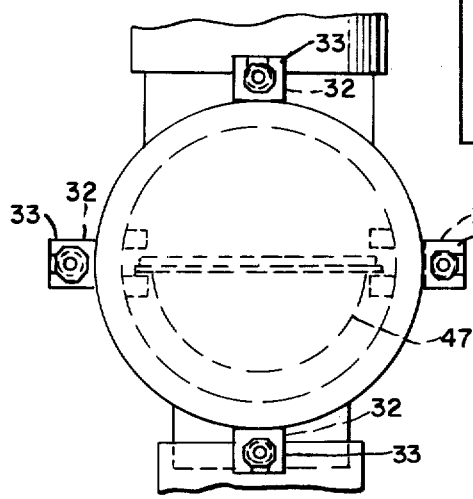
FIG. 6 is a front elevational view of the bathroom strainer device taken along line 6—6 of FIG. 5.
Figure 7:
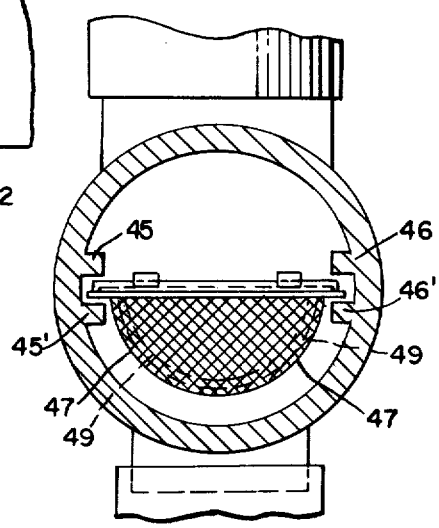
FIG. 7 is a front cross-sectional view of the bathroom strainer device taken along line 7—7 of FIG. 5.

A modified form of the front end cap 40 is illustrated in FIG. 8 may be employed. The cap 40 is threadably attached to the sleeve 28 by a threaded connection between the cap and sleeve. A rubber seal 41 is mounted between the cap 40 and an annular ridge 42, fixed to the sleeve 28, to provide a water-tight seal between the cap 40 and the sleeve 28 when the cap has been threaded tightly onto the sleeve and against the seal. A pair of ridges 45 and 45' extend along one side of the inside of the sleeve 28 and a pair of ridges 46 and 46' extend along the other side of the inside of the sleeve 28.

A sleeve holder 47 has a mesh type or screen type channel portion 48 which receives a disposable paper mesh strainer member 49 therein. The holder 47 has a pivotally mounted wire frame 50 which pivots about one end 51 of the holder to pivot down flush against the upper edges of the sleeve holder 47, when the strainer 49 is fitted into the channel 48 to hold the stainer 49 in the holder.

Once the frame 50 has been pivoted down against the strainer 49, the holder and strainer are slid into the sleeve with the edge 53 of the strainer, edge 48' of the holder, and the wire frame 50 along one side of the holder and strainer sliding in between the pair of ridges 45 and 45' and with the edge 53' of the strainer and the edge 48" of the holder and the edge of the wire frame 50 along the other side of the holder and strainer sliding in between the pair of ridges 46 and 46' to hold the strainer and holder in the sleeve 28, as illustrated in FIG. 2.

Thereafter the cap 29 is bolted onto the sleeve 28 to close the sleeve 28 in watertight relation with the strainer and strainer holder mounted therein. In the event the modified form of cap 40 is employed, the cap 40 will be screwed or threaded onto the sleeves 28 at this time, to close the sleeve 28 in watertight relation.

The strainer 49 acts to receive and collect dirt and sewage that is deposited in the bathroom wash basin during its use when the bathroom sink with the strainer 20 is installed in a dwelling such as a house or motel or the like.

When the bathroom sink is used for washing and the like, the dirt and sewage will travel down through the opening in the sink down the connection 23 into the strainer 49. The dirt and sewage particles will be trapped in the disposable mesh strainer 49. The perforations in the strainer and strainer holder will allow the more minute dirt and sewage particles to travel through the strainer and strainer holder and the outlet pipe 26 to the sewage system.

The owner of the dwelling will remove the cap 29 approximately once a week and slide the holder 47, with the strainer 49 therein, out of the sleeve 28, and pivot the frame 50 upward and remove the strainer 49 with the dirt and sewage collected therein and will dispose of it in the garbage. He will then install a new strainer 49 into the holder 47 and pivot the frame 50 down against the strainer 49 and slide the strainer and holder back into the sleeve 28 and thread the cap 29 back onto the sleeve 28.

He will repeat this operation every week or two to prevent the more bulky type of dirt and sewage from collecting in the trap of the outlet pipe 26 which might otherwise clog the trap and outlet pipe 26 as more and more of this type of dirt and sewage collects in the outlet pipe 26 with prolonged use.

The strainer device is easily accessible and easily operated by simply removing the end cap 29 and removing and replacing the strainer without the need of removing the outlet pipe 27 as would otherwise be necessary. It is intended that this type of strainer device might be installed in bathtub, shower stalls, and water drain outlets.

It will be obvious that the strainer invention enables the dwelling owner to clean the drain outlet without the need, in most instances, for costly plumbing tools or professional plumbing help or assistance.

A conventional drain plug 55 is illustrated to open and close the outlet of the basin 21. The plug 55 may be raised and lowered by conventional means by a conventional lever mounted in sleeve 28, which lever has one end which extends into the pipe 23 and connects with the plug 55, and the other end of the lever is connected to a conventional handle rod which extends down to the lever so that the raising of the handle rod from a point on the top of the basin acts to pivot the lever to raise the plug to open the drain and lowering the handle acts to lower the plug to close the drain, which structure is already well known in the art.

A second modified form of strainer invention 56 is illustrated in FIGS. 9 - 15, inclusive.

The modified form of strainer invention 56 is employed in a conventional kitchen type basin or sink 57.

Figure 9:
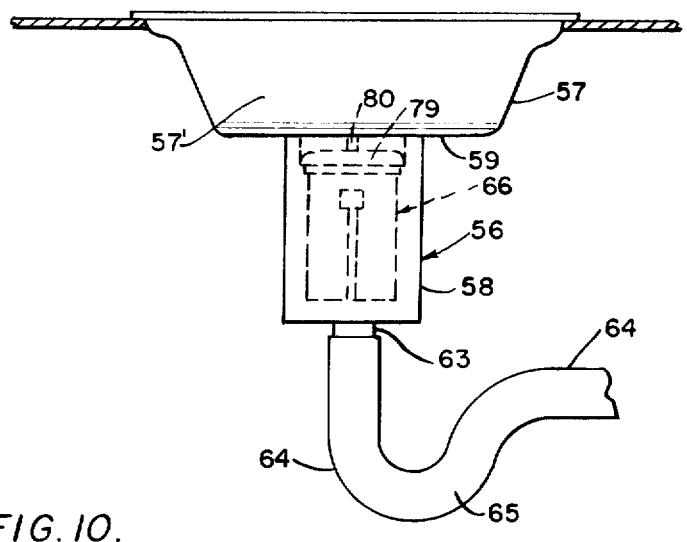
FIG. 9 is a second modified form of the invention illustrating a disposable strainer device for kitchen type sinks and the like, in a side elevational view of the kitchen sink strainer basket device installed in a drain pipe of a kitchen sink.
Figure 10:
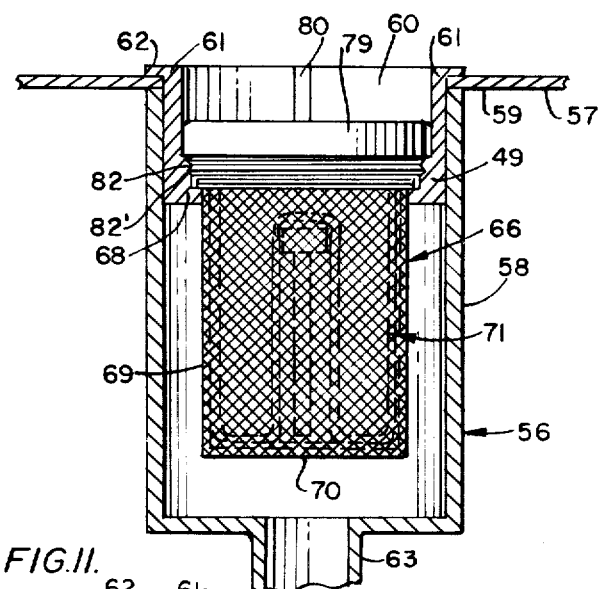
FIG. 10 is an enlarged cutaway view of the kitchen sink drain pipe apparatus installed in a drain pipe of a kitchen sink.
Figure 12:
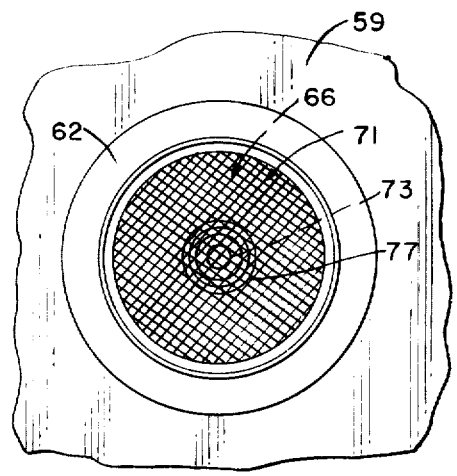
FIG. 12 is a top plan view of the chamber and strainer holder disposable strainer with the kitchen sink stopper removed.
Figure 11:
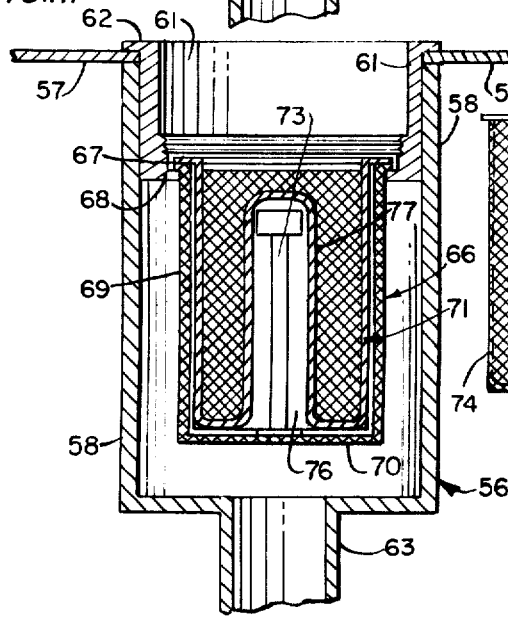
FIG. 11 is an enlarged cutaway view of the chamber beneath the kitchen sink with a cutaway view of the strainer holder and disposable strainer with the sink stopper removed.
Figures 13, 14, 15:
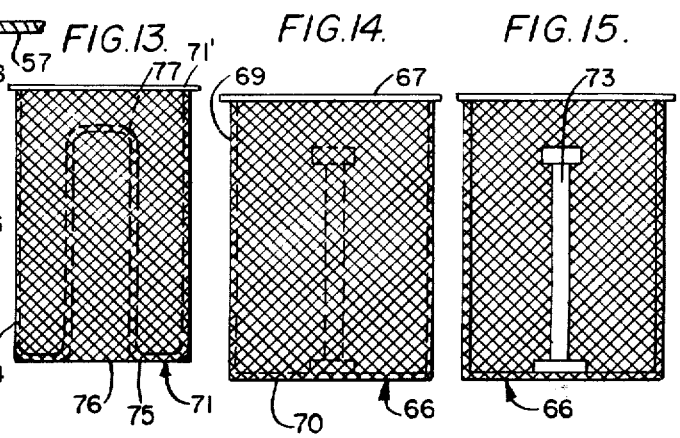
FIG. 13 is a side elevational view of the disposable strainer for the kitchen sink chamber.
FIG. 14 is a side elevational view of the strainer holder.
FIG. 15 is a cutaway view of the strainer holder.

FIG. 9 illustrates a conventional type of kitchen sink. It is intended that the sink illustrated has a horizontal width of and length of approximately the same distance so that the sides 57' of the sink are all of the same approximate horizontal length to form a square type of sink or basin.

The kitchen type strainer invention device 56 has a vertica cylindrical sleeve or casing 58. The sleeve or casing 58 abutts the bottom 59 of the basin or sink 57 about the opening 60 in the basin or sink, with the upper end of the sleeve or casing 58 fixed to a collar type sleeve 61. The collar type sleeve 61 has an annular projecting flange 62 which projects vertically over the top of the edge of the opening 60 and rests upon the edge of the opening, thereby providing a fixed connection between the basin 57 and the sleeve or casing 58. The lower end of the sleeve casing 58 has an outlet conduit 63 which is mounted to the conventional drain outlet pipe 64. The drain outlet pipe 64 has a conventional trap portion 65 with the other end of the pipe 64 connected to a conventional drainage outlet or sewage system.

The strainer invention will be mounted in a kitchen type basin for use in dwellings such as homes, motels and the like.

A wire cylindrical strainer holder 66 is mounted in the sleeve or casing 58 by being slid down through the opening 60 in the kitchen basin 57 and through the sleeve 61. The strainer holder has an annular projecting ridge 67 which rests upon an inwardly projecting ridge 68 of the sleeve or casing 58.

The wire strainer holder 66 is made of wire mesh along its sides 69 and its bottom 70 so as to be perforated along the wall 69 and the bottom 70. The strainer holder 66 may have a metal rod 73 fixed to its bottom 70 that projects upward with an enlarged knob at the top which serves as a handle for grasping the strainer holder 66.

The paper mesh strainer 71 has a metal annular ridge 71', a cylindrical mesh wall 74, and a bottom 75. The mesh wall and bottom may be made of paper mesh having small openings therethrough to form a strainer or screen. The strainer 71 has a raised center portion 76 in the center of its bottom 75 that forms a cylindrical sleeve 77 extending upward therefrom and surrounding the rod of the strainer holder with a rounded top over the rod. The sleeve 77 may be made of paper mesh or it may be made of cardboard of sufficient hardness or thickness so that an operator may grasp the sleeve 77 to lift the disposable strainer 71 out of the strainer holder 66. The paper mesh may be prestarched so the strainer or basket will have a relatively fixed shape, as shown in the drawings, so as to make it easier to install the strainer into the strainer holder. It will retain its shape until water dissolves the starch after which time the starch will be soft and pliable.

The strainer 71 is relatively large and relatively deep in relation to the sink 57 so that a large quantity of garbage may be received in the strainer 71.

Thus in its operation, the kitchen sink may be used to wash dishes and the like. Bulker garbage will travel down the basin into the basin opening 61 and down into the strainer 71 where it will be collected and retained in the strainer 71, while the more minute pieces of garbage and the water in the basin will travel down the basin and through the openings in the strainer and strainer holder and out the outlet pipe 64 and into the sewage system.

The disposable basket or strainer 71 may be removed by lifting it by its annular ridge 71' up and out of the strainer holder through the sleeve type collar 61 and through the opening 60 in the basin, and may be dumped or disposed of in the garbage. Then a new disposable basket may be inserted down through the basin opening and through the sleeve and into the strainer holder.

Thus it will be seen that by the strainer or disposable basket being relatively large in relation to the sink much or all of the garbage in a dish washing operation in a house will be able to be received entirely within the disposable basket. This eliminates the need to dump the basket several times during the dish washing operations each day.

A cylindrical disc-like cap 79 may be threaded onto the sleeve type collar through the openings in the collar from the basin to close the drain outlet. The disc-like cap has a ridge 80 fixed diametrically across its top which ridge serves as a handle to rotate the cap to thread the cap into the sleeve collar. The cap 79 and sleeve type collar have cooperating threaded portions 82 and 82' to enable the cap to be threaded into the collar type sleeve.

The strainer holder and strainer will have at least one half inch clearance from the sleeve 58, so that water coming down the drain into the strainer and strainer holder can escape out through the side walls of the strainer and strainer holder, into the sleeve, while the strainer is filling up with refuse and food particles strained from the water.

A perforated disc may be inserted in the annular notch at the bottom of the sleeve so as to extend across the outlet 63, out of the sleeve to provide a secondary strainer.

In the past conventional basket type metal strainers and seals have been provided having a relatively shallow basket with a rubber seal beneath the basket with the basket and seal fixed together, so that if one raised the strainer the seal is also removed. These devices have not proved too satisfactory since the basket is relatively shallow and easily fills up rapidly and clogs with refuse. This clogging also interfers with and clogs the water drainage. If the basket is lifted to remove or clear out the clogging refuse in the basket the seal comes out or is removed with the basket and allows water and refuse or food particles to run down the drain with out any means to catch the refuse and particles.

Moreover these have proved unsatisfactory for other reasons, such as the fact that in some of these strainers the seal is one which is simply fixed to the basket and if one wished to completely remove the seal from the drain to allow water to drain out he must also remove the strainer. Moreover these past devices have proved unsatisfactory for other reasons.

The cap 79 of the invention is independent or separate from the strainer 66 and is mounted above the strainer 66 and strainer holder 71 rather than below the basket or strainer.

The invention provides a cap 79 which provides a watertight seal in the sink above the strainer and strainer holder until the operator wishes to release the water from the basin or sink.

The cap 79 is mounted above the strainer and strainer holder and is made independent, or constructed separately from the strainer and strainer holder, so that the operator can remove the cap or seal and release the water in the tub, basin, or sink so that water can drain out through the strainer or strainer holder without having to remove the strainer and strainer holder, so that the strainer and strainer holder can remain effective or operative at all times while the water is draining from the basin, sink, or tub to catch refuse and food particles in the water.

Also, the strainer and strainer holder being vertically elongated is relatively deep and can catch far more food particles and refuse than past devices without the strainer filling up and clogging.

The strainer holder 71 may be used alone or separately as a strainer or basket. However, when the strainer holder and strainer are used together, one can remove the strainer when it fills up with food particles and refuse and still leave the strainer holder in position to catch additional food particles and refuse as the water drains out.

The cap 79 has a screw in construction or threaded engagement with the strainer which provides a positive watertight seal so that the cap 79 will not accidentally be dislodged while washing in the tub, basin, or sink. The cap and its flanges are also recessed into the drain outlet so that the cap and flange will not project into the basin and will not be bumped as easily while washing dishes and the like in the basin.

Thus, it will be seen that the disposable strainer invention of the channel type illustrated in FIGS. 1 - 6, and the basket type illustrated in FIGS. 7 - 10, provide a novel construction for disposing of garbage in the sink.

The modified form of disposable strainer device 56 illustrated in FIGS. 9 - 15, inclusive, may also be used for floor drains, shower stall drains, and the like.

It will be obvious that various changes and departures may be made to the invention without departing from the spirit and scope thereof, and accordingly it is not intended that the invention be limited to that specifically described in the specification or as illustrated in the drawings but only as set forth in the appended claims wherein:

What is claimed is:

1. A disposable strainer device for mounting in the bottom of a sink, said strainer device comprising a sink having an opening in the bottom thereof, a vertically elongated cylindrical sleeve mounted beneath the sink and having its upper edges fixed about the opening in the sink to provide fluid communication between the opening in the sink and the sleeve, said cylindrical sleeve having an opening in the bottom, an elongated outlet pipe having an elongated cylindrical upper portion of reduced diameter relative to the sleeve and fixed about the opening in the sleeve to provide fluid communication between the lower end of the sleeve and the drain outlet pipe, a vertically elongated perforated cylindrical receptacle holder detachably fitted onto said cylindrical sleeve downward through the opening in the sink, said receptacle holder being open at the top and having a diameter greater than the object pipe and only slightly smaller than the sleeve, a disposable perforated vertically elongated receptacle holder opening at the top and detachably fitted into said first mentioned cylindrical receptacle holder downward through the opening in the sink and through its opening at the top of the first receptacle holder, and having a diameter greater than the drain outlet and only slightly smaller than the first mentioned receptacle holder, said sink opening has a diameter greater than said first mentioned and said disposable receptacle holder whereby the holders may be inserted and fitted downward into the cylindrical sleeve and removed upward from the cylindrical sleeve through said sink opening, and whereby said disposable holder may receive and strain and retain therein refuse from fluid coming down the sink opening and may be removed upward through the sink opening with the first mentioned receptacle holder remaining in place in the cylindrical sleeve, said first cylindrical receptacle holder having a vertical length of at least equal to a majority of the vertical length of the sleeve, said cylindrical sleeve having an annular ledge fixed about its upper edge and said first mentioned receptacle holder has an outward projecting annular collar fixed about its upper edge whereby said collar of said receptacle can rest upon said ledge of the cylindrical sleeve, said second mentioned disposable receptacle holder has an annular collar fixed about its upper edge whereby said collar of said second receptacle holder may rest upon said collar of said first mentioned receptacle holder, said first mentioned receptacle holder having a stem fixed centrally to the bottom of the first receptacle and projecting upward therefrom, said second mentioned receptacle holder having a hollow column shaped portion fixed centrally to its bottom with an opening in the bottom into the column shaped portion whereby the stem may be received into the column portion to stack the first and second mentioned receptacle holders together, said device having a detachable cap, said ledge of said sleeve being spaced sufficiently beneath said opening in said sink, whereby said cap may be fitted into said sleeve in said space therebeneath and said cap being narrower in height than said space therebeneath said sink opening and said ledge whereby said cap when fitted into said space has its upper surfaces beneath the upper surfaces of sink immediately adjacent the sink opening and is adjacent the tops of the receptacle holders.

* * * * *